(12) United States Patent
Zheng

(10) Patent No.: US 12,003,664 B2
(45) Date of Patent: Jun. 4, 2024

(54) AUTOMATIC REDIRECTING OF ENHANCED 911 CALLS

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 350 days.

(21) Appl. No.: 17/553,570

(22) Filed: Dec. 16, 2021

(65) Prior Publication Data

US 2023/0199110 A1  Jun. 22, 2023

(51) Int. Cl.
*H04M 3/32* (2006.01)
*H04M 3/51* (2006.01)

(52) U.S. Cl.
CPC ......... *H04M 3/323* (2013.01); *H04M 3/5116* (2013.01)

(58) Field of Classification Search
CPC ............................ H04M 3/323; H04M 3/5116
USPC ...................................................... 455/404.1
See application file for complete search history.

(56) References Cited

U.S. PATENT DOCUMENTS

| | | | |
|---|---|---|---|
| 6,128,481 A | 10/2000 | Houde et al. | |
| 6,233,445 B1 | 5/2001 | Boltz et al. | |
| 6,240,284 B1 | 5/2001 | Bugnon et al. | |
| 6,240,285 B1 | 5/2001 | Blum et al. | |
| 6,574,484 B1 | 6/2003 | Carley | |
| 6,771,742 B2 | 8/2004 | Mccalmont et al. | |
| 6,956,930 B1 | 10/2005 | Cook | |
| 7,016,478 B2 | 3/2006 | Potorny et al. | |
| 7,042,985 B1 | 5/2006 | Wright | |
| 7,133,499 B2 | 11/2006 | Winegarden | |
| 7,245,900 B1 | 7/2007 | Lamb et al. | |
| 7,420,963 B1 * | 9/2008 | Shankar | H04L 12/66 370/352 |
| 7,433,673 B1 | 10/2008 | Everson et al. | |
| 7,602,886 B1 | 10/2009 | Beech et al. | |
| 7,623,447 B1 | 11/2009 | Faccin et al. | |
| 7,734,021 B1 | 6/2010 | Croak et al. | |
| 7,764,944 B2 | 7/2010 | Rollender | |
| 7,787,856 B1 | 8/2010 | Klesper et al. | |
| 7,826,599 B2 | 11/2010 | Goldman et al. | |

(Continued)

FOREIGN PATENT DOCUMENTS

EP  3893458 A1  10/2021
WO  2017218177 A1  12/2017

*Primary Examiner* — Maria El-Zoobi
(74) *Attorney, Agent, or Firm* — Perkins Coie LLP

(57) ABSTRACT

To reduce the likelihood that test E911 calls will be improperly connected to a public safety access point (PSAP), while ensuring that mobile devices sold to consumers are correctly routed to a PSAP in an emergency, a system for automatically redirecting test E911 calls to an answering system is disclosed. An unstructured supplementary service data (USSD) node receives a first USSD message from a mobile device during E911 testing procedure at the mobile device. In response to identifying a first code in the first USSD message, the USSD node retrieves an identifier associated with the mobile device. The USSD node sends an instruction to a gateway mobile location center (GMLC) system to redirect E911 calls from the mobile device based on the retrieved identifier such that a subsequent E911 call placed by the mobile device is automatically rerouted by the GMLC to an answering line instead of a PSAP.

20 Claims, 6 Drawing Sheets

(56) References Cited

U.S. PATENT DOCUMENTS

| | | |
|---|---|---|
| 7,894,406 B2 | 2/2011 | Goldman et al. |
| 7,933,581 B2 | 4/2011 | Wijayanathan et al. |
| 7,983,652 B1 | 7/2011 | Hursey et al. |
| 8,060,083 B2 | 11/2011 | Malosh |
| 8,068,587 B2 | 11/2011 | Geldenbott et al. |
| 8,098,798 B2 | 1/2012 | Goldman et al. |
| 8,150,363 B2 | 4/2012 | Dickinson et al. |
| 8,150,364 B2 | 4/2012 | Dickinson et al. |
| 8,180,316 B2 | 5/2012 | Hwang |
| 8,185,151 B2 | 5/2012 | Goldner |
| 8,195,121 B2 | 6/2012 | Dunn et al. |
| 8,270,574 B2 | 9/2012 | Li |
| 8,289,953 B2 | 10/2012 | Ray et al. |
| 8,290,470 B2 | 10/2012 | Ray et al. |
| 8,351,973 B2 | 1/2013 | Johannesson et al. |
| 8,442,481 B2 | 5/2013 | Maier et al. |
| 8,681,782 B2 | 3/2014 | Green et al. |
| 9,582,985 B2 | 2/2017 | Shurtz |
| 9,622,061 B2 | 4/2017 | Zermeno et al. |
| 9,648,479 B2 | 5/2017 | Michaelis et al. |
| 9,681,282 B2 | 6/2017 | Gellens et al. |
| 9,756,664 B2 | 9/2017 | Edge et al. |
| 9,894,504 B2 | 2/2018 | Li et al. |
| 9,967,723 B2 | 5/2018 | Sabeur et al. |
| 10,757,557 B1 | 8/2020 | Chiang |
| 10,791,221 B1 * | 9/2020 | Vislocky ............... H04M 3/5116 |
| 2003/0109245 A1 | 6/2003 | Mccalmont et al. |
| 2006/0068753 A1 | 3/2006 | Karpen et al. |
| 2006/0234727 A1 | 10/2006 | Ashley et al. |
| 2007/0081635 A1 | 4/2007 | Croak et al. |
| 2007/0298765 A1 | 12/2007 | Dickinson et al. |
| 2009/0168974 A1 | 7/2009 | Mc |
| 2010/0166154 A1 | 7/2010 | Peters |
| 2010/0215153 A1 | 8/2010 | Ray et al. |
| 2010/0273445 A1 * | 10/2010 | Dunn ..................... H04W 76/50 455/404.1 |

* cited by examiner

AUTOMATIC REDIRECTING OF ENHANCED 911 CALLS

BACKGROUND

Mobile telephone systems offer enhanced 911 (E911) services that connect a telephone call to a public safety access point (PSAP) based on a current location of the mobile device that is placing the call. When a new mobile device or new software for an existing mobile device is released, it is important to test the mobile device to verify that the device can connect to a local PSAP. However, placing test E911 calls to a real PSAP diverts resources of the PSAP toward answering false calls and away from responding to true emergencies.

BRIEF DESCRIPTION OF THE DRAWINGS

Detailed descriptions of implementations of the present invention will be described and explained through the use of the accompanying drawings.

Figure 1:
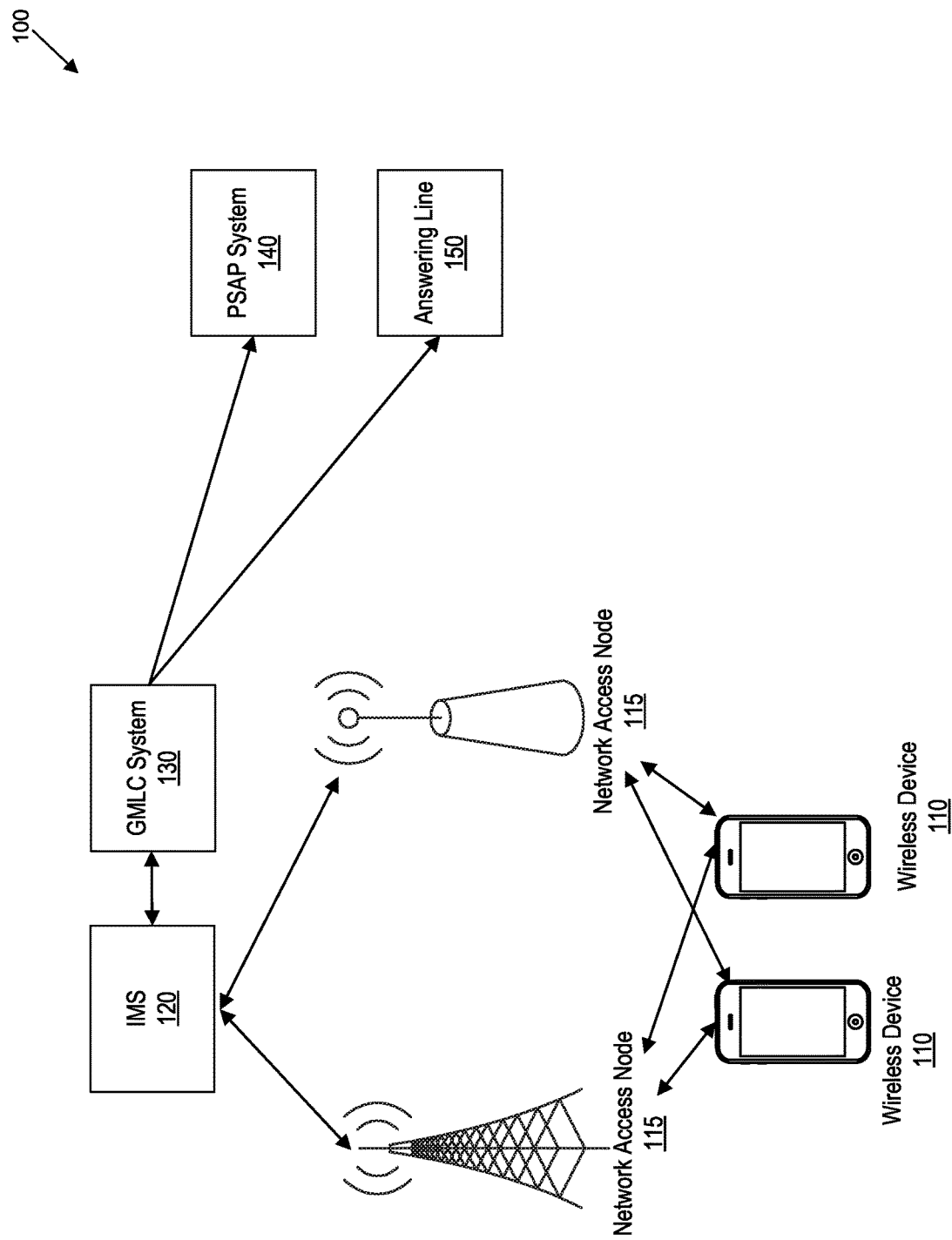
FIG. 1 is a block diagram that illustrates an environment in which enhanced 911 ("E911") services operate, in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Mobile devices with telephone capabilities typically support enhanced 911 ("E911") calling, which automatically provides the caller's location to emergency dispatchers via a public safety access point (PSAP). Before these devices or their software are released to the public, the devices are tested to ensure that they are able to complete E911 calls. However, it is undesirable for the test E911 calls to be connected to the actual PSAP because these test calls occupy the finite resources of the emergency dispatchers, possibly blocking or delaying assistance to actual emergencies. To reduce the likelihood that test E911 calls will be improperly connected to a PSAP, while ensuring that mobile devices sold to consumers are correctly routed to a PSAP in an emergency, the inventors have conceived of and reduced to practice a system for automatically redirecting test E911 calls to an answering system.

To facilitate E911 testing of mobile devices, the telecommunications network in which the mobile devices operate defines custom unstructured supplementary service data (USSD) that cause the network to perform corresponding operations. For example, a first USSD code causes the network to redirect E911 calls from a mobile device to the answering system instead of a PSAP, while a second USSD code causes the network to stop redirecting the calls to the answering line. Accordingly, test scripts for the mobile devices can cause the mobile devices to generate a first USSD message containing the first code, perform and E911 test where the call is diverted to the answering system, then generate a second USSD message containing the second code if the test call succeeded. The use of USSD codes in this manner creates a lightweight, reliable system for ensuring that mobile devices are redirected during E911 test calls and not redirected for real E911 calls.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a block diagram that illustrates an environment 100 in which enhanced 911 (E911) services operate. As shown in FIG. 1, the environment 100 includes wireless devices 110, an Internet protocol multimedia core network subsystem (IMS) 120, a gateway mobile location center (GMLC) system 130, a public safety access point (PSAP) system 140, and an answering line system 150. Other implementations of the environment 100 can include additional, fewer, or different components, and functionality can be distributed differently among the components. Furthermore, each of the systems illustrated in FIG. 1 can be implemented on one or more computing devices, as a sub-system to another system, or in a distributed or cloud computing configuration.

The PSAP 140 is an answering system configured to receive E911 calls and direct them to an emergency operator for dispatching emergency assistance (e.g., police, firefighters, ambulance, and/or other first responders). Different geographic regions can each have one or more PSAPs 140 that are dedicated to receiving E911 calls from the corresponding geographic region, such that the emergency assistance is relatively close to the person who placed the E911 call.

Wireless devices 110 are devices used by consumers (also referred to herein as "user equipment") to perform tasks including placing telephone calls. Each of the wireless devices 110 has one or more identifiers to register the device to operate on a telecommunications network and/or to uniquely identify the device to other services. Example identifiers of the wireless devices 110 include fixed identifiers such as International Mobile Equipment Identity (IMEI) numbers or International Mobile Subscriber Identity (IMSI) numbers, temporary identifiers such as a globally unique temporary identifier (GUTI) or a temporary mobile subscriber identity (TMSI), or a custom or derived device identifier. Furthermore, a data repository (e.g., at the IMS 120) may maintain identifiers that map to individual devices or to groups of devices. Although the wireless devices 110 are shown as smartphones in FIG. 1, it will be appreciated that the devices can be any suitable user equipment that can place calls over a telecommunications network, such as televisions, set-top boxes, computers, computing devices, servers, notebook computers, netbook computers, personal digital assistants (PDAs), smartphones, feature mobile phones, tablets, or in-vehicle infotainment systems (IVIs).

The wireless devices 110 send and receive communications via the IMS 120. The IMS 120 provides a variety of voice, data, and/or text message services and includes a number of components for receiving and routing calls, such as VoLTE calls, VoWiFi calls, wireless-to-wireless calls, wireless-to-landline calls, or E911 calls, to their appropriate destinations. In some implementations, the IMS 120 is substantially similar to an architectural framework defined by the 3rd Generation Partnership Project (3GPP) for delivering IP multimedia to wireless devices. Communications can be routed between the wireless devices 110 and the IMS 120 by one or more network access nodes 115.

The IMS 120 can be configured to receive, parse, and respond to unstructured supplementary service data (USSD) messages. For example, the IMS 120 can include functionality of a USSD gateway. Alternatively, the IMS 120 can be coupled to a USSD gateway and function as a USSD server.

The GMLC 130 is communicatively coupled to the IMS 120 and the PSAP 140. The GMLC 130 can be invoked when one or more components of the IMS 120 requests location services. These location services may be for a variety of operations, including routing an E911 call to the nearest PSAP 140. The GMLC 130 cooperates with the systems shown in FIG. 1, or other systems or devices not shown, to determine the location of an wireless device 110. For example, in the case of a VoLTE E911 call, the GMLC 130 can query a mobility management entity (MME) of the IMS 120 and/or a network access node 115 to determine the location of the wireless device 110. In the case of a VoWiFi E911 call, the GMLC 130 can be configured to determine the location of the wireless device by interpreting messages, such as handshaking messages and/or session initiation protocol (SIP) messages received from a WiFi access point through which the wireless device is communicating. Other methods to determine the location of the wireless device 110 can be used in addition to or instead of these techniques, including accessing a global positioning system (GPS) associated with the wireless device or querying a unified subscriber database for information about the user associated with the wireless device (such as the user's home address). Once the location of the wireless device 110 is known, the GMLC 130 can route an E911 call from the device to a geographically proximate PSAP 140.

Before wireless devices 110 are released for public sale, the devices are tested to ensure that they can perform E911 calls and connect to an appropriate PSAP. The devices may be tested again before some software updates are pushed to consumers' wireless devices to verify that the update does not affect the performance of E911 calls. Although it is important for a wireless device to connect to a correct PSAP under typical operation of a wireless device by an end user, connecting test calls to the PSAP 140 is undesirable because these test calls divert the PSAP's critical resources away from actual emergencies. Accordingly, an answering line system 150 is operated to simulate functionality of a PSAP during testing of the wireless devices 110. The answering line system 150 is an automated telephone answering system that can be configured to produce a specified output (such as a specified tone, melody, or speech) when a call from a wireless device 110 is successfully connected to the answering line system 150. The wireless devices 110 can use the output generated by the answering line system 150 as confirmation that an E911 test was successful. The answering line system 150 can be a system maintained by the telecommunications network in which the IMS 120 and GMLC 130 operate, by an operator associated with the PSAP 140, or by a third party.

The GMLC 130 maintains a redirect list that causes the GMLC to selectively route E911 calls from wireless devices 110 to a PSAP 140 or the answering line system 150. When an E911 call is received, the GMLC 130 according to implementations herein first queries the redirect list for an identifier of the wireless device. If the identifier of the wireless device is not found on the redirect list, the GMLC 130 determines the location of the device and routes the E911 call to a geographically proximate PSAP 140, as described above. If the redirect list does include the identifier of the wireless device, the GMLC 130 routes the E911 call to the answering line 150 instead of the PSAP.

The IMS 120 automatically generates instructions to cause the GMLC 130 to add wireless devices to the redirect list or remove wireless devices from the redirect list. The IMS 120 can generate the instructions in response to messages received from the wireless devices 110. In some implementations, the IMS 120 supports customized unstructured supplementary service data (USSD) messages, parsing the USSD messages for alphanumeric codes that are defined within the environment 100 to cause the IMS 120 to perform different specified functions related to the redirect list maintained by the GMLC 130. For example, the IMS 120 is configured to instruct the GMLC 130 to add a wireless device to the redirect list if the IMS receives a first USSD code from the wireless device. An example USSD message generated by the wireless device 110 is "*4652", where 4652 is a USSD code defined within the telecommunications network to cause the wireless device to be added to the redirect list. A second USSD code causes the IMS 120 to then instruct the GMLC 130 to remove the wireless device from the redirect list. The IMS 120 can also support codes that cause additional functionality, such as code that causes the IMS to output the redirection status of a particular device, or a code that causes the IMS to output identifiers of all devices currently included on the redirect list.

Some implementations of the IMS 120 are configured to use USSD messages to perform various functions described herein because, for example, USSD is a lightweight messaging protocol that supports customizable functionality and that is available on any type of device, including smart phones, feature phones, and both newer and older wireless devices. However, in other implementations, the IMS 120 is configured to receive and process other types of messages from the wireless devices 110, such as simple messaging service (SMS), user datagram protocol (UDP), transmission control protocol (TCP), message query telemetry transport (MQTT), or data distribution service (DDS) messages. Using any of these or other messaging protocols, the IMS 120 receives codes from the wireless devices 110 that each cause the IMS 120 to perform an associated function, as described above.

Figure 2A:
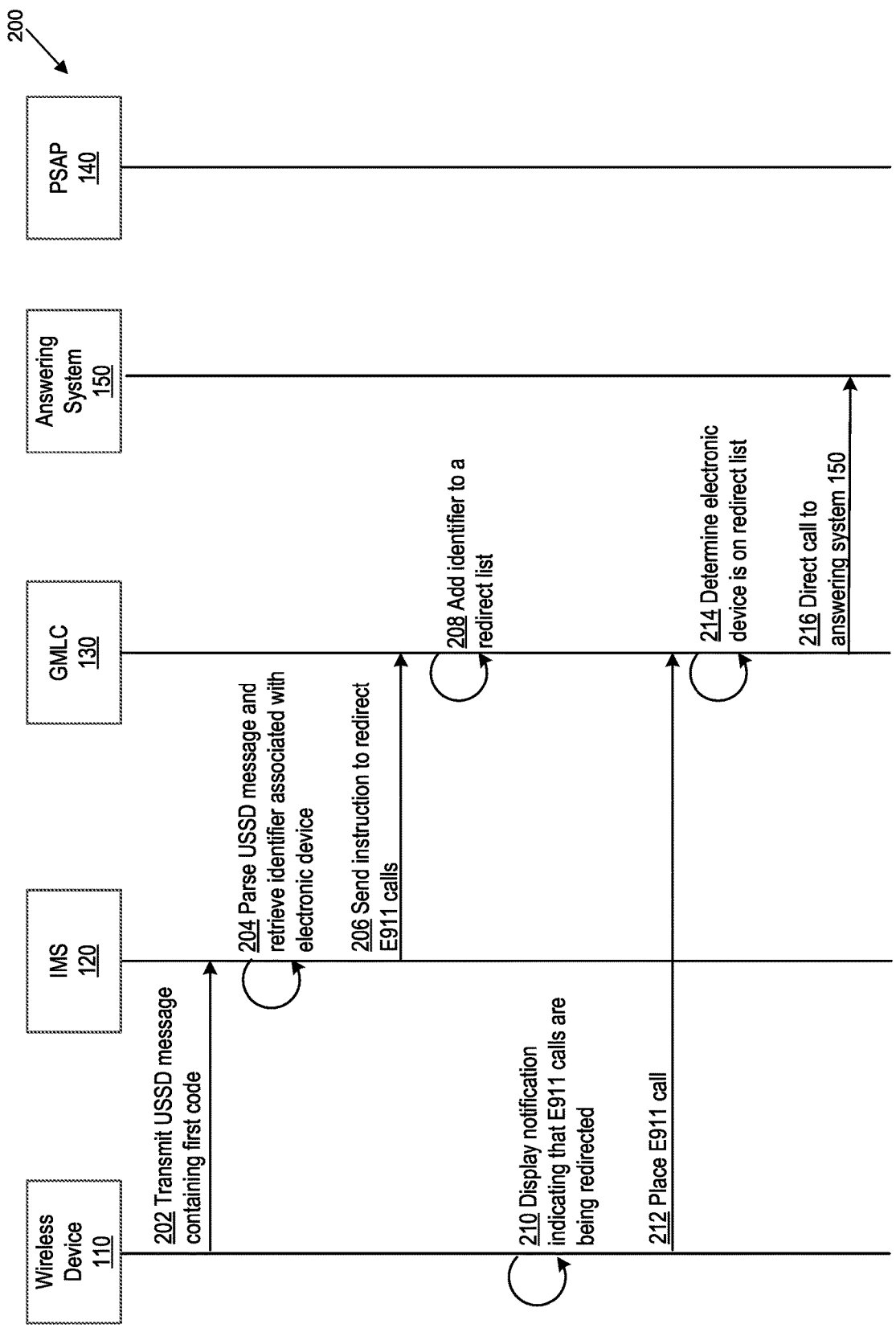
FIGS. 2A-2B are diagrams illustrating a process for testing E911 calls on wireless devices, in some implementations.
Figure 2B:
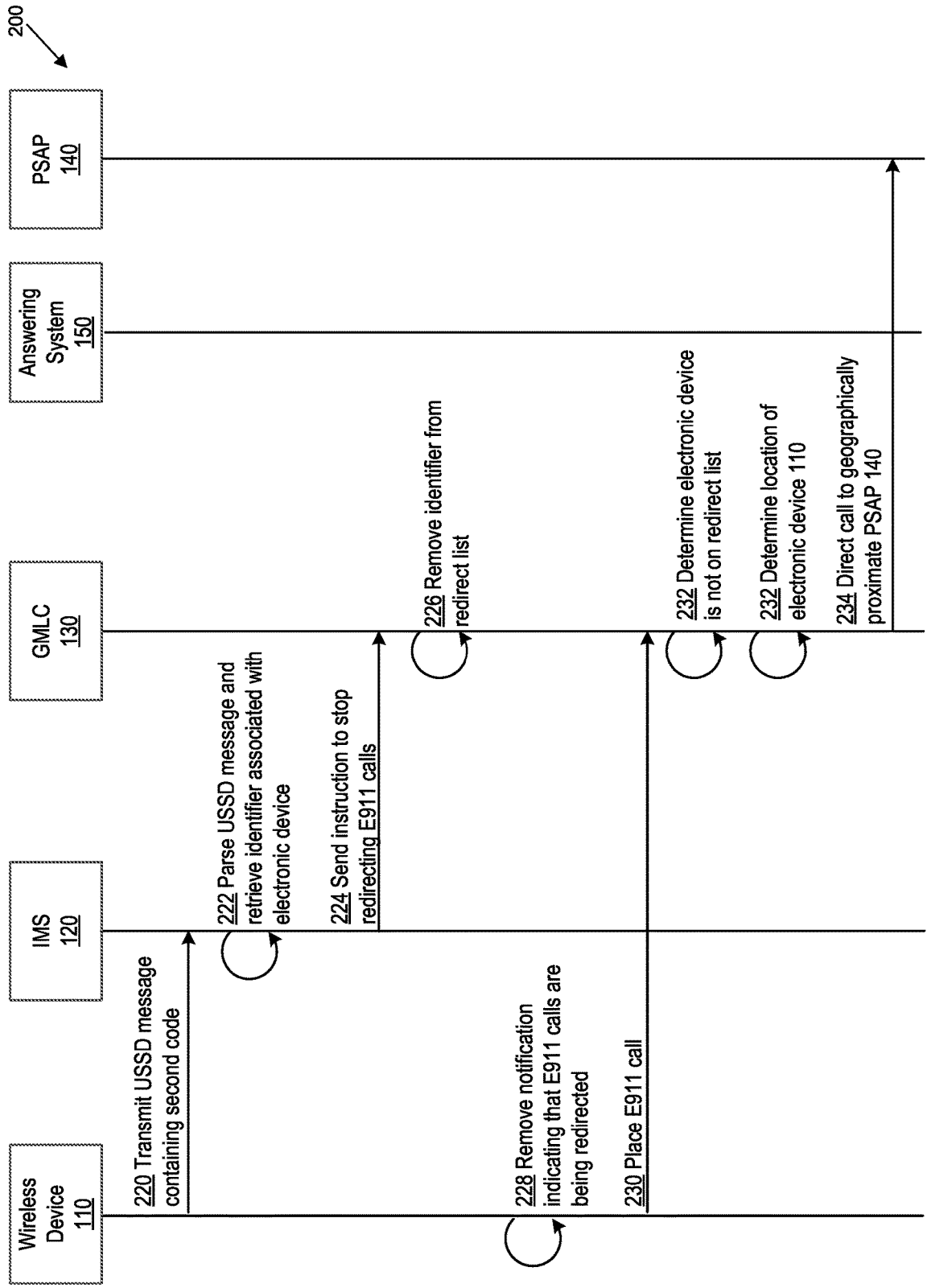

FIGS. 2A-2B are interaction diagrams illustrating a process 200 for testing E911 calls on the wireless devices 110. The process 200 can include interactions between a wireless device 110, the IMS 120, the GMLC 130, a PSAP 140, and an answering system 150. Other implementations of the process 200 can include additional, fewer, or different steps than those shown in FIGS. 2A-2B. Furthermore, some of the functionality can be performed by entities other than those illustrated. For example, the functions described herein as being performed by the IMS 120 can be performed by another system operated by the telecommunications network in which the wireless device 110 operates, or functions described as being performed by the GMLC 130 can be performed by the IMS 120.

As shown in FIG. 2A, the wireless device 110 transmits a USSD message to the IMS 120 at block 202. The transmitted USSD message contains a first code, which is a code defined within the telecom network in which the IMS system 120 operates to cause E911 calls from the wireless device 110 to be redirected. For example, a test script executed by the wireless device 110 causes the device to generate the USSD message containing the first code and transmit the message to the IMS 120.

When the IMS 120 receives the USSD message from the wireless device 110, the IMS 120 parses the message at block 204. If the first code is extracted from the parsed message, the IMS 120 retrieves an identifier of the wireless device 110. For example, the IMS 120 retrieves an identifier by querying the wireless device 110 or by querying a database maintained by the IMS 120 or other network components. In some implementations, the message received from the wireless device 110 includes the identifier of the device.

The IMS 120 send an instruction to the GMLC 130 at block 206, causing the GMLC 130 to redirect E911 calls from the wireless device 110. The instruction includes the identifier of the wireless device 110 retrieved at block 204.

At block 208, the GMLC 130 adds the identifier of the wireless device 110 to a redirect list maintained by the GMLC 130. In some implementations, the IMS 120 or the GMLC 130 returns a confirmation message to the wireless device 110 (e.g., in the form of a USSD message) to confirm that the device has been added to the redirect list. The wireless device 110 can display a notification at block 210 to indicate that E911 calls are being redirected. For example, the notification confirms to a user who is testing the wireless device that it is safe to perform an E911 test. The wireless device 110 can display the notification in response to the confirmation message received from the IMS 120 or the GMLC 130, or after transmitting the USSD message containing the first code. In some implementations, the wireless device 110 persistently displays the notification while the device is listed on the redirect list maintained by the GMLC 130.

At block 212, the wireless device 110 places an E911 call. In response to the call, the GMLC 130 is invoked to determine the location of the wireless device 110. At block 214, the GMLC 130 determines that the wireless device 110 is on the redirect list, for example by querying the redirect list using the identifier of the wireless device. When a device has been determined to be on the redirect list, the GMLC 130 directs the E911 call to the answering system 150 at block 216, rather than directing the call to the geographically nearest PSAP 140. Once the call has been directed to the answering system 150, the wireless device 110 can use the output generated by the answering system to confirm that the E911 test was successful.

In some implementations, the GMLC 130 also identifies the location of the wireless device 110 before, during, or after the redirect list is queried. Based on the determined location, the GMLC 130 can direct the E911 call to an answering system 150 that corresponds to the geographic location of the wireless device at the time of the call. For example, each geographic region can be mapped to a specific answering system 150 that produces a different output to uniquely identify the corresponding region. Thus, the specific answering system 150 that receives the test E911 call can be used to confirm that the location of the wireless device was accurately measured. Alternatively, other implementations of the GMLC 130 query the redirect list before performing any localization service for the wireless device 110, such that the GMLC 130 does not retrieve any information about the location of the device when the device is identified on the redirect list.

Turning to FIG. 2B, the process 200 continues with the wireless device 110 transmitting, at block 220, a USSD message containing a second code to the IMS 120. The second code, like the first code, is a code defined within the telecom network in which the IMS system 120 operates. However, the second code causes E911 calls from the wireless device 110 to stop being redirected to the answering system 150. A test script executed by the wireless device 110, for example, causes the device to generate the USSD message containing the second code after the E911 testing procedures described with respect to FIG. 2A have been successfully completed.

When the IMS 120 receives the USSD message from the wireless device 110, the IMS 120 parses the message at block 222. If the second code is extracted from the parsed message, the IMS 120 retrieves an identifier of the wireless device 110 (such as the IMEI of the device). The IMS 120 correspondingly sends an instruction to the GMLC 130 at block 224 to remove the wireless device 110 from the redirect list, and the GMLC 130 removes the identifier of the wireless device 110 from the redirect list at block 226.

In some implementations, the IMS 120 or the GMLC 130 returns a confirmation message to the wireless device 110 (e.g., in the form of a USSD message) to confirm that the device has been removed from the redirect list. In response, the wireless device 110 can remove, at block 228, the notification persistently displayed to indicate that E911 calls were being redirected. Alternatively, the wireless device 110 can temporarily display a notification to indicate that E911 calls are no longer being redirected.

After the wireless device 110 has been sold to a consumer, or as further testing of the device prior to sale, the user of the device may experience a need to place an E911 call. Accordingly, when the wireless device 110 places an E911 call at block 230, the GMLC 130 is invoked to determine the location of the wireless device 110. At block 232, the GMLC 130 queries the redirect list for the identifier of the device 110. If the device 110 is determined to not be on the redirect list, the GMLC 130 determines the location of the device 110 at block 234 and directs the E911 call to the nearest PSAP 140 at block 236.

Accordingly, the process 200 illustrated in FIGS. 2A-2B enables the E911 functionality of a wireless device to be tested, ensuring that the test E911 calls do not burden the PSAP but that real E911 calls placed by a consumer will be directed to the correct PSAP.

Wireless Communications System

Figure 3:
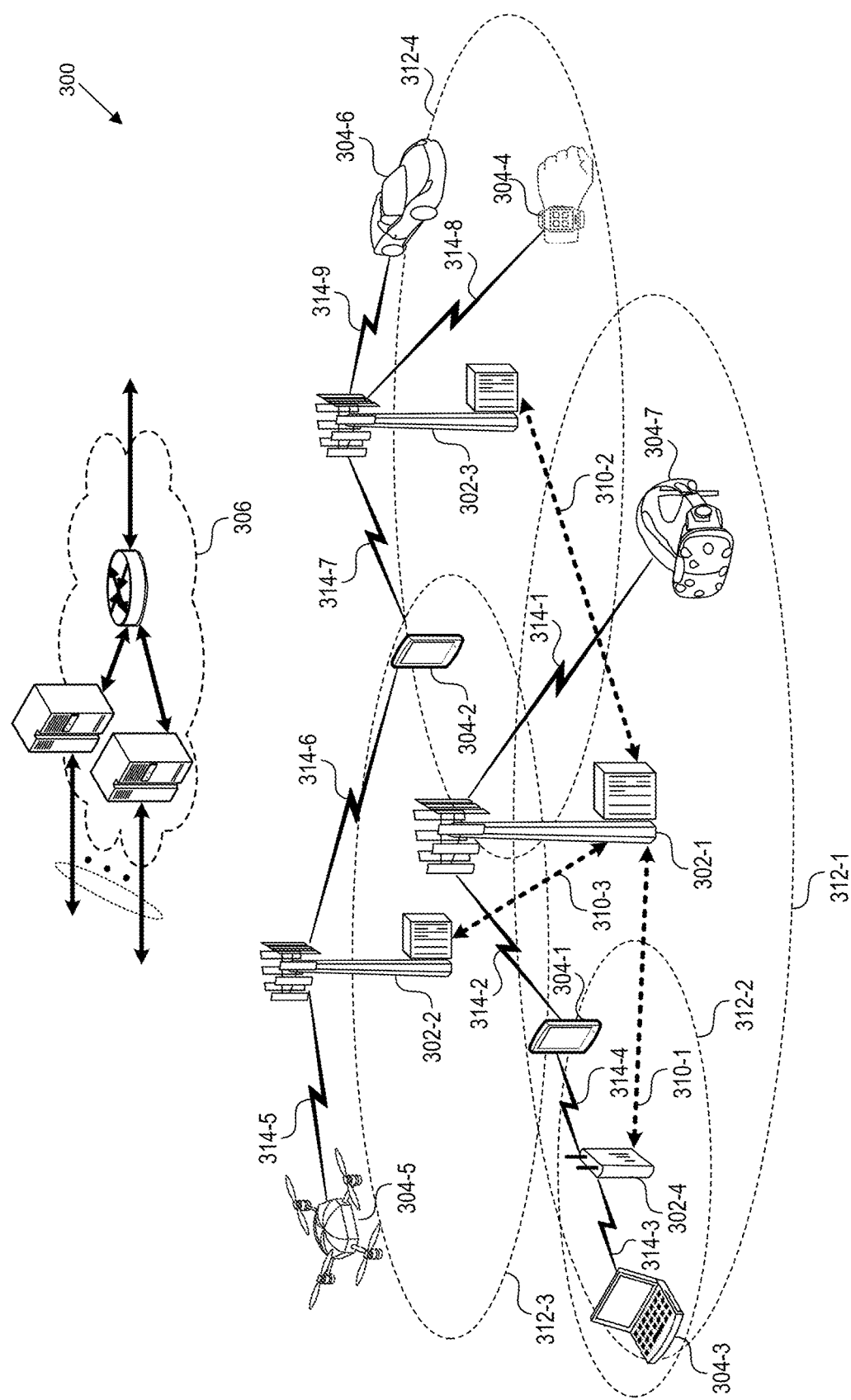
FIG. 3 is a block diagram that illustrates a wireless communications system.

FIG. 3 is a block diagram that illustrates a wireless telecommunication network 300 ("network 300") in which aspects of the disclosed technology are incorporated. The network 300 includes base stations 302-1 through 302-4 (also referred to individually as "base station 302" or collectively as "base stations 302"). A base station is a type of network access node (NAN) that can also be referred to as a cell site, a base transceiver station, or a radio base station. The network 300 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 300 formed by the network 300 also include wireless devices 304-1 through 304-7 (referred to individually as "wireless device 304" or collectively as "wireless devices 304") and a core network 306. The wireless devices 304-1 through 304-7 can correspond to or include network 300 entities capable of communication using various connectivity standards. For example, a 5G communication channel can use millimeter wave (mmW) access frequencies of 28 GHz or more. In some implementations, the wireless device 304 can operatively couple to a base station 302 over a long-term evolution/long-term evolution-advanced (LTE/LTE-A) communication channel, which is referred to as a 4G communication channel.

The core network 306 provides, manages, and controls security services, user authentication, access authorization, tracking, Internet Protocol (IP) connectivity, and other access, routing, or mobility functions. The base stations 302 interface with the core network 306 through a first set of backhaul links (e.g., S1 interfaces) and can perform radio configuration and scheduling for communication with the wireless devices 304 or can operate under the control of a base station controller (not shown). In some examples, the base stations 302 can communicate with each other, either directly or indirectly (e.g., through the core network 306), over a second set of backhaul links 310-1 through 310-3 (e.g., X1 interfaces), which can be wired or wireless communication links.

The base stations 302 can wirelessly communicate with the wireless devices 304 via one or more base station antennas. The cell sites can provide communication coverage for geographic coverage areas 312-1 through 312-4 (also referred to individually as "coverage area 312" or collectively as "coverage areas 312"). The geographic coverage area 312 for a base station 302 can be divided into sectors making up only a portion of the coverage area (not shown). The network 300 can include base stations of different types (e.g., macro and/or small cell base stations). In some implementations, there can be overlapping geographic coverage areas 312 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 300 can include a 5G network 300 and/or an LTE/LTE-A or other network. In an LTE/LTE-A network, the term eNB is used to describe the base stations 302, and in 5G new radio (NR) networks, the term gNBs is used to describe the base stations 302 that can include mmW communications. The network 300 can thus form a heterogeneous network 300 in which different types of base stations provide coverage for various geographic regions. For example, each base station 302 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 300 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 300 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 300 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 304 and the base stations 302 or core network 306 supporting radio bearers for the user plane data. At the Physical (PHY) layer, the transport channels are mapped to physical channels.

Wireless devices can be integrated with or embedded in other devices. As illustrated, the wireless devices 304 are distributed throughout the wireless telecommunications network 300, where each wireless device 304 can be stationary or mobile. For example, wireless devices can include handheld mobile devices 304-1 and 304-2 (e.g., smartphones, portable hotspots, tablets, etc.); laptops 304-3; wearables 304-4; drones 304-5; vehicles with wireless connectivity 304-6; head-mounted displays with wireless augmented reality/virtual reality (ARNR) connectivity 304-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 304-1, 304-2, 304-3, 304-4, 304-5, 304-6, and 304-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 300 equipment at the edge of a network 300 including macro eNBs/gNBs, small cell eNBs/gNBs, relay base stations, and the like. A wireless device can also communicate with other wireless devices either within or outside the same coverage area of a base station via device-to-device (D2D) communications.

The communication links 314-1 through 314-9 (also referred to individually as "communication link 314" or collectively as "communication links 314") shown in network 300 include uplink (UL) transmissions from a wireless device 304 to a base station 302, and/or downlink (DL) transmissions from a base station 302 to a wireless device 304. The downlink transmissions can also be called forward link transmissions while the uplink transmissions can also be called reverse link transmissions. Each communication link 314 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 314 can transmit bidirectional communications using frequency division duplex (FDD) (e.g., using paired spectrum resources) or Time division duplex (TDD) operation (e.g., using unpaired spectrum resources). In some implementations, the communication links 314 include LTE and/or mmW communication links.

In some implementations of the network 300, the base stations 302 and/or the wireless devices 304 include multiple antennas for employing antenna diversity schemes to improve communication quality and reliability between base stations 302 and wireless devices 304. Additionally or alternatively, the base stations 302 and/or the wireless devices 304 can employ multiple-input, multiple-output (MIMO) techniques that can take advantage of multi-path environments to transmit multiple spatial layers carrying the same or different coded data.

5G Core Network Functions

Figure 4:
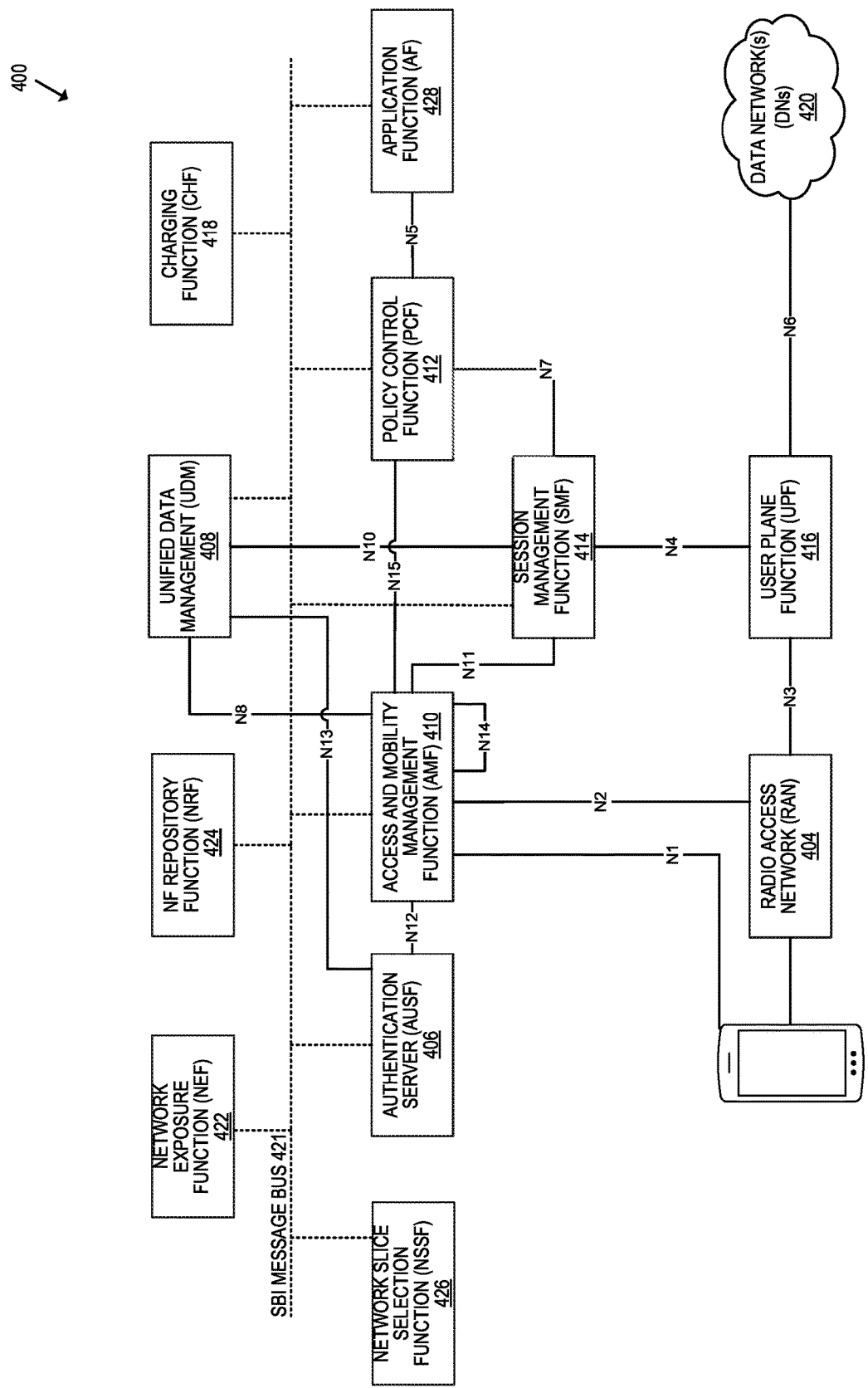
FIG. 4 is a block diagram that illustrates 5G core network functions (NFs) that can implement aspects of the present technology.

FIG. 4 is a block diagram that illustrates an architecture 400 including 5G core network functions (NFs) that can implement aspects of the present technology. A wireless device 402 can access the 5G network through a NAN (e.g., gNB) of a RAN 404. The NFs include an Authentication Server Function (AUSF) 406, a Unified Data Management (UDM) 408, an Access and Mobility management Function (AMF) 410, a Policy Control Function (PCF) 412, a Session Management Function (SMF) 414, a User Plane Function (UPF) 416, and a Charging Function (CHF) 418.

The interfaces N1 through N15 define communications and/or protocols between each NF as described in relevant standards. The UPF 416 is part of the user plane and the AMF 410, SMF 414, PCF 412, AUSF 406, and UDM 408 are part of the control plane. One or more UPFs can connect with one or more data networks (DNs) 420. The UPF 416 can be deployed separately from control plane functions. The NFs of the control plane are modularized such that they can be scaled independently. As shown, each NF service exposes its functionality in a Service Based Architecture (SBA) through a Service Based Interface (SBI) 421 that uses HTTP/2. The SBA can include a Network Exposure Function (NEF) 422, a NF Repository Function (NRF) 424 a Network Slice Selection Function (NSSF) 426, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 424, which maintains a record of available NF instances and supported services. The NRF 424 allows other NF instances to subscribe and be notified of registrations from NF instances of a given type. The NRF 424 supports service discovery by receipt of discovery requests from NF instances and, in response, details which NF instances support specific services.

The NSSF 426 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 402 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 408 and then requests an appropriate network slice of the NSSF 426.

The UDM 408 introduces a User Data Convergence (UDC) that separates a User Data Repository (UDR) for storing and managing subscriber information. As such, the UDM 408 can employ the UDC under 3GPP TS 42.101 to support a layered architecture that separates user data from application logic. The UDM 408 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 408 can contain voluminous amounts of data that is accessed for authentication. Thus, the UDM 408 is analogous to a Home Subscriber Server (HSS), to provide authentication credentials while being employed by the AMF 410 and SMF 414 to retrieve subscriber data and context.

The PCF 412 can connect with one or more application functions (AFs) 428. The PCF 412 supports a unified policy framework within the 5G infrastructure for governing network behavior. The PCF 412 accesses the subscription information required to make policy decisions from the UDM 408, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 424. This allows the SCP to become the delegated discovery point in a datacenter, offloading the NRF 424 from distributed service meshes that make-up a network operator's infrastructure. Together with the NRF 424, the SCP forms the hierarchical 5G service mesh.

The AMF 410 receives requests and handles connection and mobility management while forwarding session management requirements over the N11 interface to the SMF 414. The AMF 410 determines that the SMF 414 is best suited to handle the connection request by querying the NRF 424. That interface and the N11 interface between the AMF 410 and the SMF 414 assigned by the NRF 424, use the SBI 421. During session establishment or modification, the SMF 414 also interacts with the PCF 412 over the N7 interface and the subscriber profile information stored within the UDM 408. Employing the SBI 421, the PCF 412 provides the foundation of the policy framework which, along with the more typical QoS and charging rules, includes Network Slice selection, which is regulated by the NSSF 426.

Computer System

Figure 5:
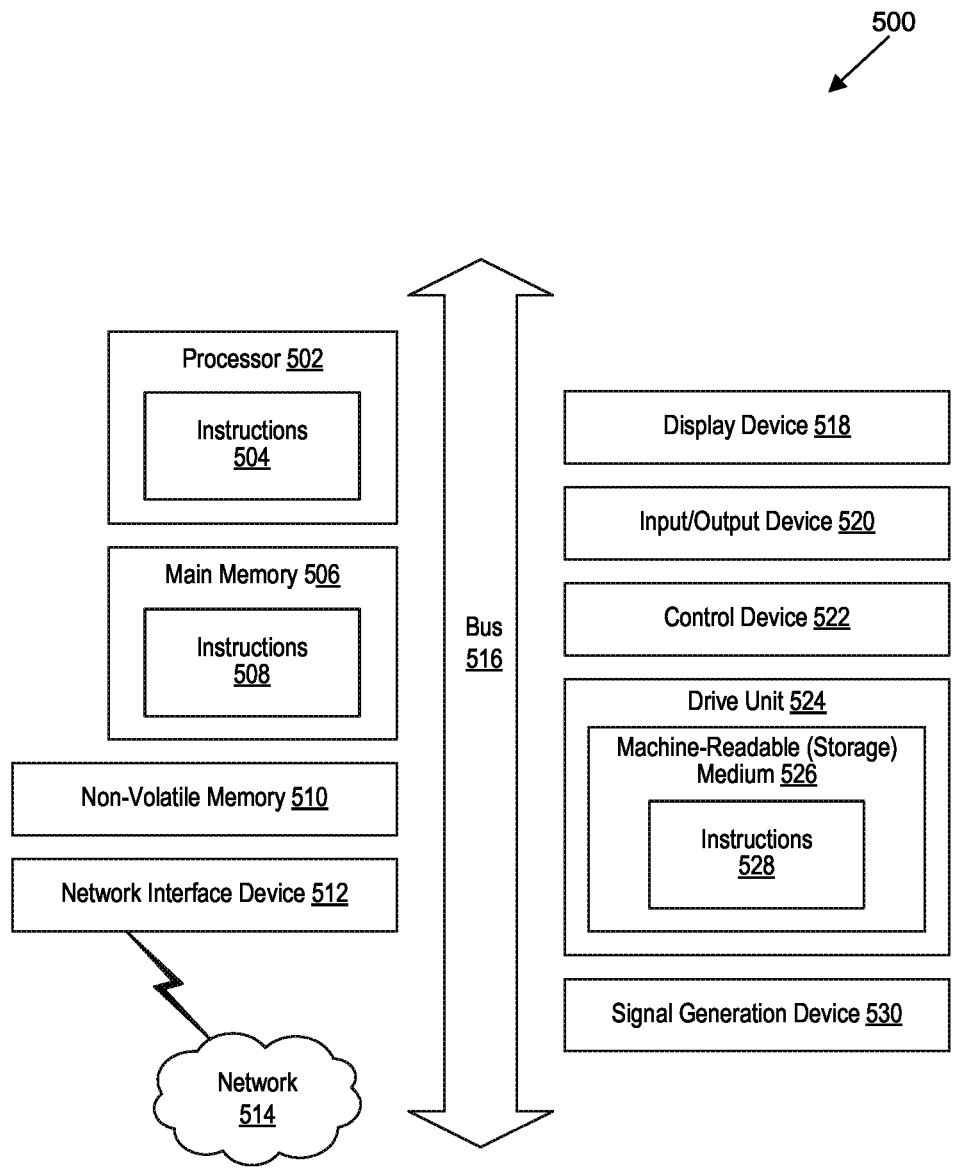
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable wireless device, network-connected ("smart") device (e.g., a television or home assistant device), AR/VR systems (e.g., head-mounted display), or any wireless device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

U.S. Patent Application No. 2019/0132903 is incorporated by reference herein in its entirety. In addition, any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system operating as an unstructured supplementary service data (USSD) node, the system comprising:
   at least one hardware processor; and
   at least one non-transitory memory storing instructions, which, when executed by the at least one hardware processor, cause the system to:
      receive, from a mobile device, a first USSD message generated by the mobile device during an enhanced 911 (E911) testing procedure;
      in response to identifying a first code in the first USSD message, retrieve an identifier associated with the mobile device; and
      send an instruction to a gateway mobile location center (GMLC) system to redirect E911 calls from the mobile device based on the retrieved identifier such that a subsequent E911 call placed by the mobile device is automatically rerouted by the GMLC to an answering line instead of a public safety access point (PSAP).

2. The system of claim 1, wherein the instructions when executed further cause the system to:
   after sending the first instruction to the GMLC, transmit a confirmation to the mobile device to indicate that E911 calls from the mobile device are being redirected to the answering line.

3. The system of claim 2, wherein the confirmation causes the mobile device to display a notification to indicate that E911 call from the mobile device are being redirected to the answering line.

4. The system of claim 1, wherein the instructions when executed further cause the system to:
   receive from the mobile device, a second USSD message; and
   in response to identifying a second code in the second USSD message, send a second instruction to the GMLC system to stop redirecting E911 calls from the mobile device to the answering line, such that an E911 call placed by the mobile device is directed to the PSAP by the GMLC after the second instruction is sent.

5. The system of claim 4, wherein the instructions when executed further cause the system to:
   after sending the first instruction to the GMLC, transmit a first confirmation to the mobile device to indicate that E911 calls from the mobile device are being redirected to the answering line,
      wherein the first confirmation causes the mobile device to display a persistent notification to indicate that E911 call from the mobile device are being redirected to the answering line; and
   after sending the second instruction to the GMLC, transmit a second confirmation to the mobile device to indicate that E911 calls from the mobile device are no longer being redirected to the answering line,
      wherein the second confirmation causes the mobile device to stop displaying the persistent notification.

6. The system of claim 1, wherein the first instruction comprises a command to add the identifier of the mobile device to a redirect list maintained by the GMLC.

7. The system of claim 6, wherein the instructions when executed further cause the system to:
   in response to receiving, from the mobile device, a third USSD message containing a third USSD code, transmit the redirect list to the mobile device.

8. The system of claim 1, wherein the instructions when executed further cause the system to:
   in response to receiving, from the mobile device, a fourth USSD message that contains a fourth USSD code and specifies an identifier of user equipment, query the redirect list using the identifier of the user equipment; and
   transmit, to the mobile device, an indication of whether the user equipment is listed on the redirect list based on the query.

9. At least one computer-readable storage medium, excluding transitory signals and carrying instructions, which, when executed by at least one data processor of a system, cause the system to:
   receive from user equipment, a first unstructured supplementary service data (USSD) message;

in response to identifying a first code in the first USSD message, retrieve an identifier associated with the user equipment; and send a first instruction to a gateway mobile location center (GMLC) system to redirect enhanced 911 (E911) calls from the user equipment based on the retrieved identifier such that a subsequent E911 call placed by the user equipment is automatically rerouted by the GMLC to an answering line instead of a public safety access point (PSAP).

10. The at least one computer-readable storage medium of claim 9, wherein the instructions when executed further cause the system to:

after sending the first instruction to the GMLC, transmit a confirmation to the user equipment to indicate that E911 calls from the user equipment are being redirected to the answering line.

11. The at least one computer-readable storage medium of claim 10, wherein the confirmation causes the user equipment to display a notification to indicate that E911 call from the user equipment are being redirected to the answering line.

12. The at least one computer-readable storage medium of claim 9, wherein the instructions when executed further cause the system to:

receive from the user equipment, a second USSD message; and in response to identifying a second code in the second USSD message, transmit a second instruction to the GMLC system to stop redirecting E911 calls from the user equipment to the answering line, such that an E911 call placed by the user equipment is directed to the PSAP by the GMLC after the second instruction is sent.

13. The at least one computer-readable storage medium of claim 12, wherein the instructions when executed further cause the system to:

after sending the first instruction to the GMLC, transmit a first confirmation to the user equipment to indicate that E911 calls from the user equipment are being redirected to the answering line, wherein the first confirmation causes the user equipment to display a persistent notification to indicate that E911 call from the user equipment are being redirected to the answering line; and after sending the second instruction to the GMLC, transmit a second confirmation to the user equipment to indicate that E911 calls from the user equipment are no longer being redirected to the answering line, wherein the second confirmation causes the user equipment to stop displaying the persistent notification.

14. The at least one computer-readable storage medium of claim 9, wherein the first instruction comprises a command to add the identifier of the user equipment to a redirect list maintained by the GMLC.

15. The at least one computer-readable storage medium of claim 14, wherein the instructions when executed further cause the system to:

in response to receiving, from the user equipment, a third USSD message containing a third USSD code, transmit the redirect list to the user equipment.

16. The at least one computer-readable storage medium of claim 9, wherein the instructions when executed further cause the system to:

in response to receiving, from the user equipment, a fourth USSD message that contains a fourth USSD code and specifies an identifier of a mobile device, query the redirect list using the identifier of the mobile device; and transmit, to the user equipment, an indication of whether the mobile device is listed on the redirect list based on the query.

17. A gateway mobile location center (GMLC) system operating within a telecommunications network, the GMLC system comprising:

at least one hardware processor; and at least one non-transitory memory storing instructions, which, when executed by the at least one hardware processor, cause the GMLC system to:

maintain a redirect list including identifiers of user equipment that are undergoing enhanced 911 (E911) testing, wherein an identifier of selected user equipment is automatically added to the redirect list or automatically removed from the redirect list based on unstructured supplementary service data (USSD) messages originating from the selected user equipment that contain corresponding USSD codes defined within the telecommunications network; and selectively route E911 calls placed by user equipment to a public safety access point (PSAP) or an answering line based on the redirect list.

18. The GMLC system of claim 17, wherein the instructions when executed further cause the GMLC system to:

receive notification that identified user equipment has initiated an E911 call;

query the redirect list for an identifier of the identified user equipment;

in response to determining the redirect list does not include the identifier of the identified user equipment, determine a geographic location of the identified user equipment; and direct the E911 call from the identified user equipment to a PSAP selected based on its proximity to the determined geographic location of the identified user equipment.

19. The GMLC system of claim 17, wherein the instructions when executed further cause the GMLC system to:

output the redirect list to a wireless device in response to a USSD message containing a corresponding code defined within the telecommunications network to cause the GMLC system to output the redirect list.

20. The GMLC system of claim 17, wherein the instructions when executed further cause the GMLC system to:

query the redirect list for an identifier of specified user equipment in response to a USSD message, received from a wireless device, that contains a corresponding code defined within the telecommunications network to cause the GMLC system to return a redirect status of the specified user equipment; and transmit the redirect status to the wireless device, the transmitted redirect status indicating whether the specified user equipment is identified on the redirect list based on the query.

\* \* \* \* \*